D. G. CASWELL.
VELOCIPEDE.
APPLICATION FILED MAY 8, 1911.
1,011,408.
Patented Dec. 12, 1911.
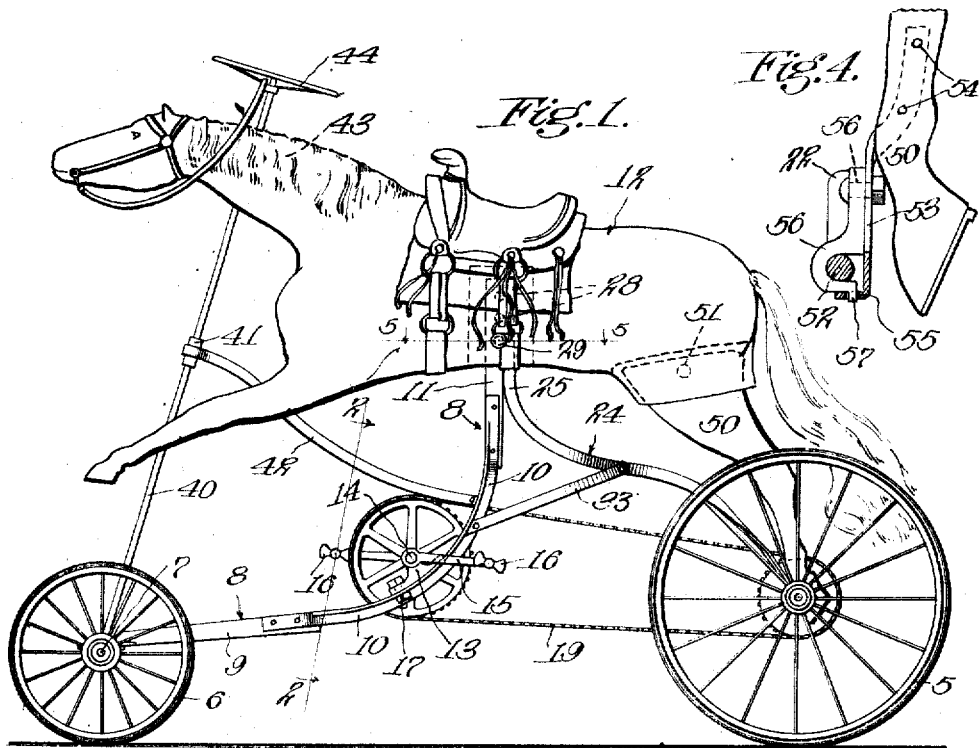
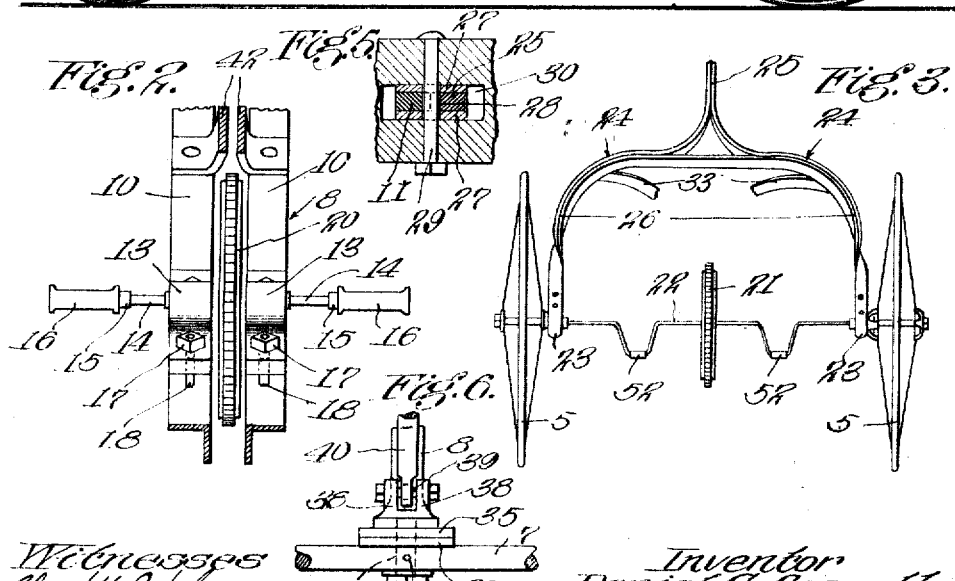
Witnesses
Inventor
Daniel G. Caswell
his Attorney

UNITED STATES PATENT OFFICE.

DANIEL G. CASWELL, OF LOS ANGELES, CALIFORNIA.

VELOCIPEDE.

1,011,408.  Specification of Letters Patent.  Patented Dec. 12, 1911.

Application filed May 8, 1911. Serial No. 625,929.

*To all whom it may concern:*

Be it known that I, DANIEL G. CASWELL, a citizen of the United States, residing at Los Angeles, in the county of Los Angeles, State of California, have invented new and useful Improvements in Velocipedes, of which the following is a specification.

This invention relates to improvements in my invention entitled "Velocipedes," for which Letters Patent No. 984,648, were issued to me on the 21st day of February, 1911; and relates particularly to various improvements in structure and arrangements of the different parts of the device.

Broadly, the device consists of the same combination as described in my prior patent—the combination of a running gear with an animal figure movably mounted thereon, means being provided for moving the figure as the running gear moves over the ground. Preferably the figure is pivoted and is given an oscillating movement by the motion of the running gear. I have made several changes in the specific structure of the device and now wish to cover my specific structure in its details. These details will be best understood from the following specification and the accompanying drawings, in which:

Figure 1 is a side elevation of my improved device. Fig. 2 is an enlarged sectional detail taken on line 2—2 of Fig. 1. Fig. 3 is a view of the rear portion of the running gear. Fig. 4 is a detail showing the preferred method of connection of the oscillating figure to the rear shaft of the device. Fig. 5 is a detail section taken on line 5—5 of Fig. 1. Fig. 6 is a detail elevation showing the connection of the steering axle and steering rod.

In the drawings I have shown a structure with four wheels, two rear and two front, 5 and 6, respectively, the driving being accomplished through the medium of the front wheels. The front wheels are mounted on an axle 7 which is pivoted to front frame member 8. Front frame member 8 extends rearwardly and curves upwardly, being formed of a single piece 9 at its forward end, of double spaced members 10 in its central portion and of a single piece 11 in its rear vertical portion, piece 11 extending upwardly and within the body of Fig. 12. Members 10, forming the central portion of front frame member 8, carry bearings 13 in which crank axle 14 is mounted carrying cranks 15 and pedals 16. Bearings 13 are made adjustable in position, their securing bolts 17 passing through slots 18 in members 10. This provides for adjusting the tension on driving chain 19. Driving chain 19 passes over and connects sprockets 20 and 21 mounted on crank shaft 14 and rear wheel axle 22. Axle 22 is mounted in bearings 23 in rear frame member 24. Rear frame member 24 is constructed as illustrated in Figs. 1 and 3, having a forward and upper portion 25 which projects upwardly immediately behind portion 11 of the front frame member, and having a double or U-shaped rear portion 26 which carries bearing 23 on its ends. Portions 11 and 25 of the two frames are secured together by two plates 27 and a series of apertures 28 be provided through which pivot bolt 29 may be passed to form the pivotal support of Fig. 12. An aperture 30 is cut in Fig. 12 around the upper ends of members 11 and 25, the aperture being of sufficient size to allow the oscillation of the figure without binding upon the frame members. The series of holes provides for adjustment of height of the figure above pedals 16, thus making provision for riders of different sizes. Braces 33 are provided between the rear and front frame members for stiffening the frame as a whole.

Front axle 7 is pivotally mounted on the forward end of front frame 8 through the medium of bearing plates 35 and a king-bolt 36. King-bolt 36 is rigidly secured to axle 7 in any preferred manner, say by a pin 37 or by being squared. On the upper end of the king-bolt a yoke member 38 is arranged with a transverse bolt 39. Steering rod 40 is flattened at its lower end and enters between the sides of yoke 38 and engages loosely with bolt 39. It is desirable that this connection be loose as it is preferred to slant the steering rod 40 slightly rearwardly; and if the joint were made tight it would bind when the steering rod was turned to one side or the other. The steering rod is supported in a bearing 41 held by members 42 which project forwardly from member 10 of front frame member 8. The steering rod projects upwardly through a slot 43 in the neck of Fig. 12, the slot being of sufficient extent to allow the free oscillation of the figure without binding on the steering rod. A steering wheel 44 is provided at the upper end of the steering rod; this I prefer on account of neat appearance and small size to a pair of handle-bars, although the handle-bars may be used if desired. In my former invention I preferred to have the steering rod supported at its upper end by the neck of the figure passing loosely through an aperture therein; but I have found that there is a liability of binding and hence consider the construction now shown to be preferable.

For oscillating the figure from the rear axle I have shown the rear legs 50 of the figure pivoted at 51 to the body. And I have shown a means of connecting the feet to cranks 52 on the rear axle and consisting of flat strips 53 passing along the inside of the leg and secured by rivets 54, the strip having an aperture 55 in its lower part; and a bearing member 56 with a lug 57 adapted to project through aperture 55 and secured to strip 53 by a bolt 56. This construction provides for easy disconnection of the figure from the rear axle cranks. However, I may use a different construction, wherein the legs of the figure are rigidly attached thereto and connecting rods are pivotally attached to the rear axle cranks and to the legs. In this case the strip 53 would be utilized to pass around the inner faces of the legs to reinforce them. The construction has some advantages and may be slightly cheaper than my preferred form; but in general I prefer the form first described.

Having described my invention, I claim:

A device of the character described, comprising a forward steering and supporting wheel and a pair of rear supporting and traction wheels, a steering axle connected to the forward wheel, a driving axle connected to the rear wheels and having crank means thereon, a forward frame member mounted on the steering axle and extending rearwardly and curving upwardly to a point intermediate and above the two axles, the said frame member having a bifurcated portion near its center, a rear frame member having a U-shaped portion with its ends journaled on the rear driving axle and having a portion extending forwardly and curving upwardly to a point adjacent the upper end of the forward frame member, means for securing the said frame members together, braces extending from the U-shaped portion of the rear frame member to the forward frame member, an axle mounted in bearings across the bifurcated portion of the forward frame member, pedals on the ends of the axle, a sprocket wheel on the axle between the bifurcations of the frame member, a sprocket wheel on the rear driving axle, a chain connecting the two sprocket wheels, a pivot on the two frame members at their juncture, a figure mounted on said pivot, connecting means between the rear end of the figure and the crank means on the rear driving axle, a steering rod connected to the front steering axle and extending upwardly and having manually engageable means on its upper end, and a supporting member for the steering rod extending from the forward frame and having a journal through which the steering rod passes.

In witness that I claim the foregoing I have hereunto subscribed my name this 1st day of May 1911.

DANIEL G. CASWELL.

Witnesses:
EDWARD H. BARKELEW,
Mrs. D. G. CASWELL.